Aug. 15, 1950     E. R. KNOWLES     2,519,255
INJECTION MOLDING PRESS
Filed April 17, 1946     5 Sheets-Sheet 1
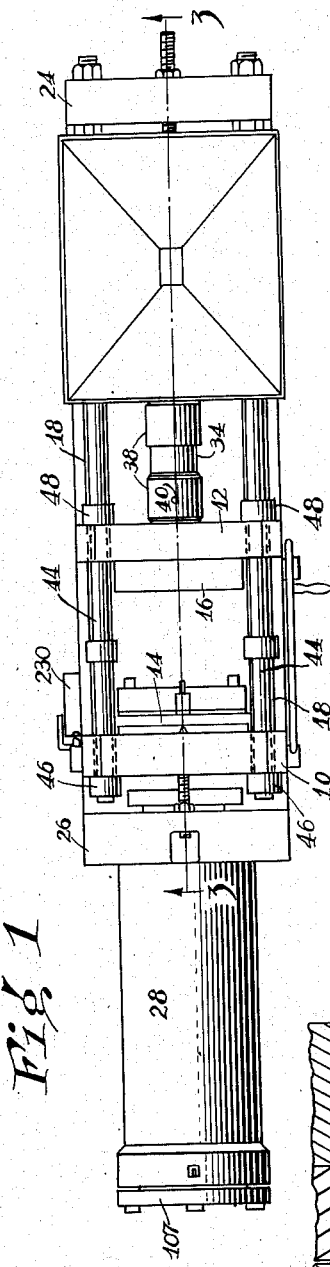
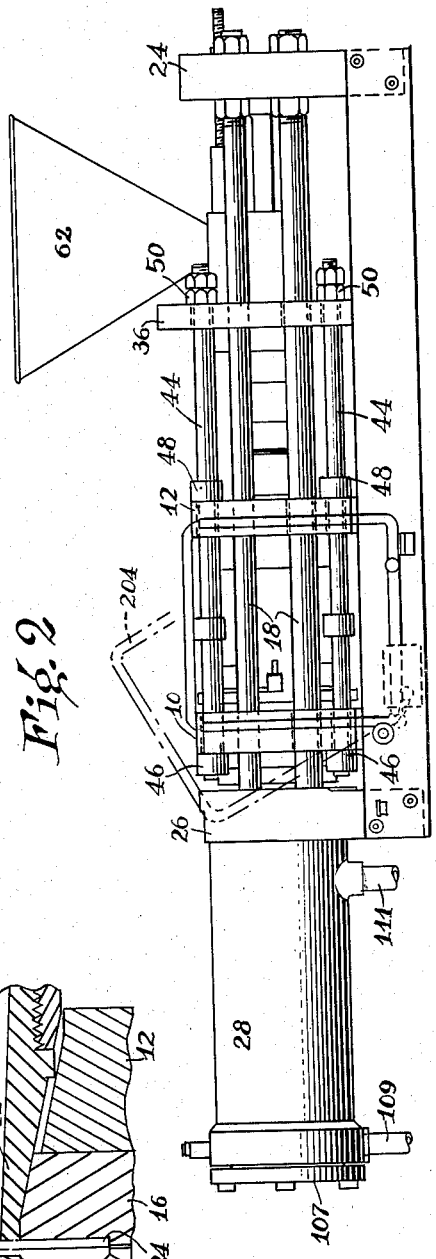
INVENTOR:
Edward R. Knowles
BY

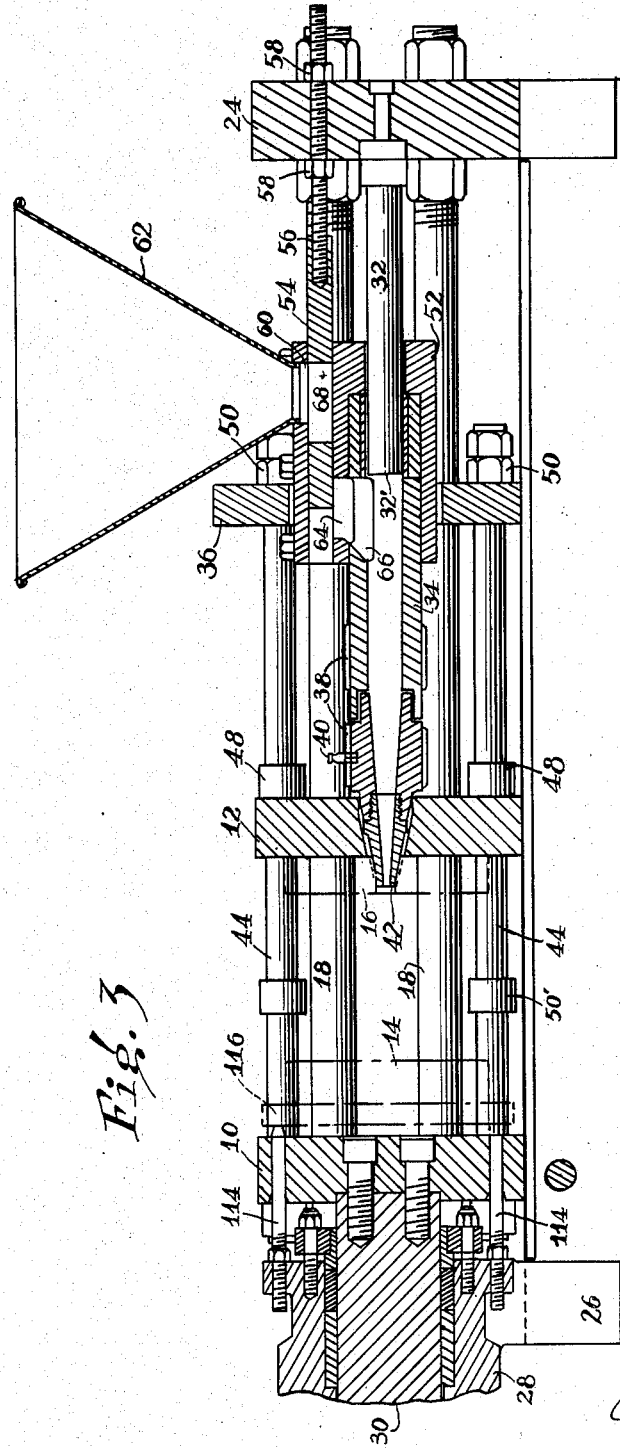

Aug. 15, 1950     E. R. KNOWLES     2,519,255
INJECTION MOLDING PRESS
Filed April 17, 1946     5 Sheets-Sheet 4

INVENTOR:
Edward R. Knowles
BY

Aug. 15, 1950   E. R. KNOWLES   2,519,255
INJECTION MOLDING PRESS
Filed April 17, 1946   5 Sheets-Sheet 5

Inventor:
Edward R. Knowles
By
Attorney

Patented Aug. 15, 1950

2,519,255

UNITED STATES PATENT OFFICE 2,519,255

INJECTION MOLDING PRESS

Edward R. Knowles, Nashua, N. H., assignor to Improved Paper Machinery Corporation, Nashua, N. H., a corporation of Maine Application April 17, 1946, Serial No. 662,826

2 Claims. (Cl. 18—30).

This invention relates to plastic injection molding machines, and aims to provide improvements and refinements therein which will simplify the operations, and will reduce the cost of construction of the machine, as compared with prior art devices of the general type.

It is an object of this invention to provide such a machine in which a single source of pressure performs both the die clamping and the injection functions.

It is a further object of the invention to provide a construction in which the molded parts are formed without the usual "sprue" of plastic extending from the article molded toward the injection nozzle, which sprue represents waste material which must be removed from the article by a separate operation.

It is a still further object of this invention to provide, in a machine as aforesaid, adjustable and fully automatic control of each operating cycle.

An additional object is to provide the option of manual control of each operating cycle.

Another object of the invention is to provide a machine as aforesaid which will be simple in construction and operation, and of minimum cost in view of the results attained.

The manner in which I accomplish the above and other objects will be clear from the following detailed description taken in connection with the annexed drawings, representing one embodiment of my invention, and in which:

Fig. 1 is a plan view of the operating elements in the improved machine;

Fig. 2 is a side elevation corresponding to Fig. 1;

Fig. 3 is a section taken on the line 3—3 of Fig. 1;

Fig. 3A is a section similar to Fig. 3, showing the remainder of the machine;

Fig. 10 is a detail of the relationship of the injection nozzle to the die cavities;

Figure 4:
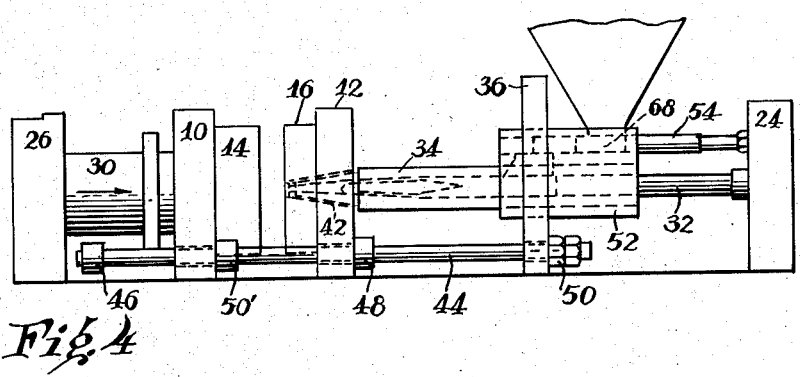
Figs. 4, 5 and 6 are side elevations showing consecutive relationships of the parts during the forward or operative stroke.

In the most common form of injection molding, a two-part die is provided in which each die part has a series of molding cavities which, when the die parts are clamped together, form a series of individual molds. A gate or sprue is provided, usually substantially at the center of the pattern of molding cavities, and is connected with each of the cavities by a channel or runway. The die halves are clamped together and an injection nozzle is placed against the central sprue or gate, and plastic material which has been brought to the requisite moldable condition is injected through the gate, thence through the channels and into the individual mold cavities. Upon the completion of the injection step sufficient time is allowed to permit the plastic material to harden to a point at which the parts may be handled. The mold halves are then separated and the molded parts removed. The lines of plastic connecting the finished articles with the central gate, and the sprue between the gate and the nozzle, are later removed by suitable trimming operations.

Heretofore it has been customary to utilize one pressure generating means to operate the mold halves, and a second pressure generating device to perform the injection step.

The present invention utilizes a single pressure generating device which at a single operation not only closes and clamps the dies, but performs the injection operation. The general organization of parts is shown in Figs. 1 and 2 in which there is illustrated a movable platen 10 and a relatively stationary platen 12, which has, however, and as will appear more clearly hereinafter, an absolute movement of its own. A die 14 is secured to the movable platen 10, and a complementary die 16 is secured to the relatively stationary platen 12. The platens 10 and 12 are slidably mounted upon, and are held in alignment by, four tie rods 18, of which only three are visible in Figs. 1 and 2. These rods engage a frame member 24 at the injection end of the machine, and a generally similar frame member 26 at the compression end. The frame member 26 is integrally secured to the hydraulic cylinder 28. A piston 30 is mounted within the cylinder 28 and engages the movable platen 10.

Fig. 3A shows specifically how the platen 10 is actuated by hydraulic piston 30 having an enlarged end 101 which has a sliding fit in a bore 103 in the cylinder 28. The piston 30 passes through any convenient form of stuffing box 105 at the end adjacent the platen 10, and the opposite end of the cylinder is closed by a cylinder head 107. Fluid under pressure is admitted through a duct 109 in the end of the cylinder adjacent the cylinder head 107 to drive platen 10 to the right, while fluid under pressure is introduced at the opposite end of the cylinder through a duct 111 in order to return the parts to a starting position. Numeral 112 designates an air cock of conventional design to permit undesired air to be bled out of the cylinder when required.

A pair of studs 114 (Fig. 3) are mounted in the member 26 and penetrate the platen 10. When the platen is fully retracted the studs 114 encounter a bar 116 to which a plurality of conventional knock out pins are secured. These pins penetrate the platen 10 and the die 14 associated therewith, and operate to knock out the freshly formed parts which are carried by the die 14 after it has been separated from the die 16 following the injection step.

An injection piston 32 (Fig. 3) is secured to the frame member 24 and is aligned with an injection cylinder 34. The injection cylinder 34 is mounted on a frame member 36 through the intermediary of a sleeve 52 to be described below; member 36, in turn, is slidably mounted on the rods 18. The injection cylinder assembly includes heating elements 38 which are controlled by a thermocouple 40 which governs a thermostat 214 to be described hereafter. Cylinder 34 terminates in an injection nozzle 42 which penetrates the relatively stationary platen 12 and into die 16.

Operating rods 44 are slidably mounted to pass through platens 10 and 12 and frame member 36. These rods are four in number and are parallel to, and arranged to lie outside of, the pattern of the tie rods 18.

On the outer or compression side of the platen 10 operating rods 44 have secured thereto stop members 46. At the injection side of the relatively stationary platen 12 the operating rods 44 have attached thereto stop members 48, while at the outer or injection side of the frame member 36 the tie rods have secured thereto stop members 50. Stop members 50 are in the form of lock nuts to provide a general adjustment of the overall effective length of the tie rods 44 and the overall spacing of the stop members 46, 48 and 50.

Referring now to Fig. 3, the rearward end of the injection cylinder is surrounded by a sleeve 52 in which is formed a passageway for a feeder valve 54. Valve 54 receives a threaded stud 56 which passes through the frame member 24. Lock nuts 58 on opposite ends of frame member 24 permit the position of the valve 54 to be adjusted relative to the member 24, and therefore relative to the sleeve 52. A feeding opening 60 is formed in the upper side of the sleeve 52 and a hopper 62 is fixedly mounted therein. The sleeve 52 has below the passage for the valve member 54 an opening 64 which registers with a similar opening 66 in the cylinder 34. With the parts in the position shown in Fig. 3, opening 68 in the valve member 54 registers with the uppermost opening 60 in sleeve 52, and therefore with the hopper 62. Under these conditions a charge of granular plastic material in the hopper 62 may enter the opening 68 provided in the valve member 54.

Figure 5:
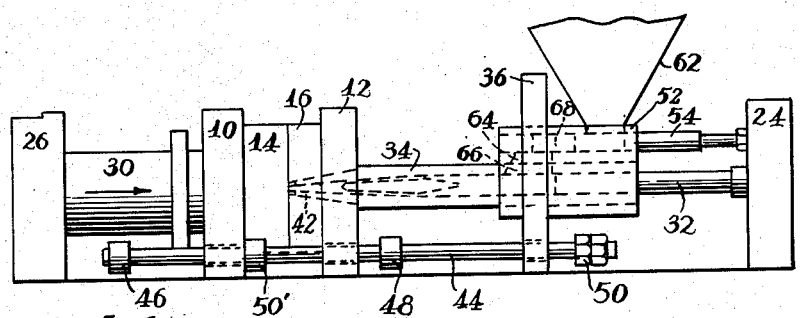
Figure 6:
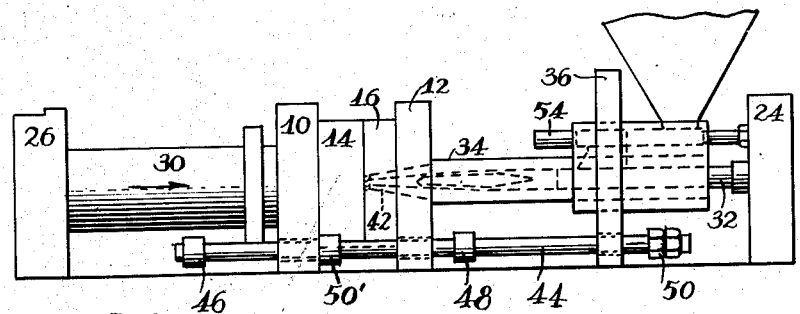
Figure 7:
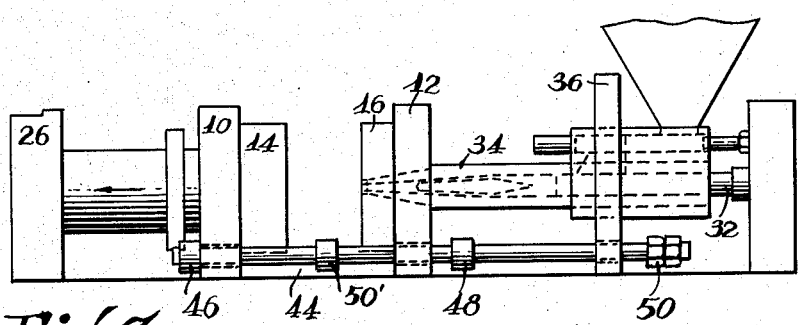
Figs. 7, 8 and 9 are side elevation views showing consecutive relationships on the return stroke.
Figure 8:
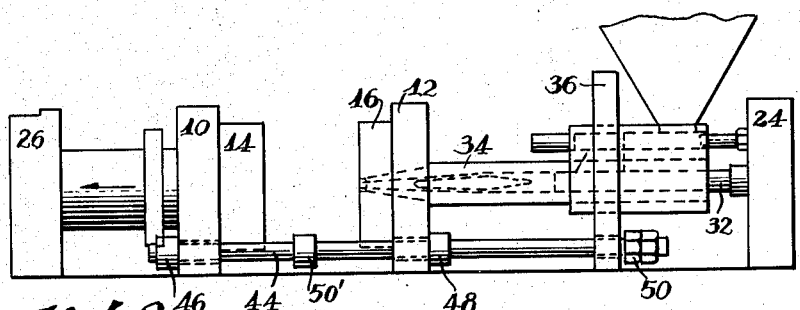
Figure 9:
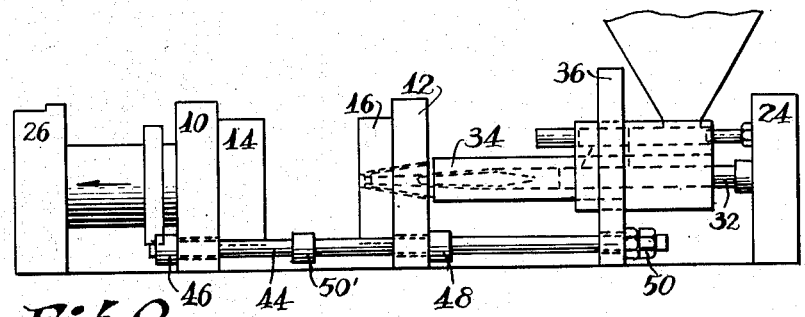

The operation of the injection stroke of the device may best be understood by reference to the simplified views of Figs. 4, 5 and 6. Under the impetus of the piston 30 the platen 10 and its die 14 move toward the platen 12 and its die 16. Substantially at the same time the die 14 meets the die 16, platen 10 engages an auxiliary stop 50' on the rods 44, so that the rods 44 thereafter move with the platen 10 toward the frame member 24. After engagement of the dies 14 and 16 the platen 12 is carried toward the injection cylinder 34 so that the nozzle 42 is firmly engaged within the die 16. Continued advance of platen 10 then carries rearwardly the entire injection assembly including the sleeve 52, the hopper 62 and the frame member 36. The piston 32 being affixed to the frame member 24 remains stationary and therefore in effect advances into the cylinder 34 and injects a charge of plastic material into the molds formed in the dies 14 and 16. Continued rearward movement of the injection assembly brings the openings 64 and 66 in the sleeve 52 and cylinder 34 respectively under the opening 68 provided in the valve member 54, and permits a portion of the charge of plastic material in the valve member 54 to be deposited within said openings 64 and 66 and upon plunger 32, for later deposit within the bore of cylinder 34 upon retraction of the latter along the plunger 32. The extent to which the opening 68 in the valve 54 is permitted to overlap the openings 64 and 66, and therefore the amount of plastic delivered to the cylinder 34, is regulated by adjusting nuts 58 as above described. The position of the parts illustrated in Fig. 6 is the ultimate operating position, and the parts are maintained therein for sufficient time to permit preliminary hardening of the molded objects.

At the end of the requisite time the piston 30 begins its return movement and draws with it the platen 10. At first the platen 10 merely operates to separate the dies 14 and 16. The platen 10 then engages stops 46 and thereafter draws with platen 10 the rods 44. The stop 48 is adjusted so as to engage the platen 12 about $\tfrac{1}{16}$ inch before the stop 50 engages the frame member 36. The result is to bring about a slight separation of the nozzle 42 from the die 16 and the platen 12, so as to limit the conduction of heat into the die and platen to those times only at which the nozzle must actually be engaged with the die and platen. This prevents the accumulation of an excessive temperature differential between the dies 14 and 16.

Fig. 10 illustrates the particular relationship of the injection nozzle 42 to the platen 12 and the dies 14 and 16. A bore 120 is formed in the platen 12 sufficiently large to permit the platen 12 to be fully penetrated by the nozzle 42. A bore 122 is formed in the die 16 and is contoured for a precise fit with the exterior of the nozzle 42. This brings the free extremity of the nozzle flush with the die cavity 124 (which may be the central one of a plurality of such cavities, connected by channels) in the die 16, which, in turn, registers with a die cavity 126 in the die 14. With this arrangement there is no gate or sprue formed between the piece molded in the die cavity 124—126 and the end of the nozzle, so that when the molded parts are removed the die molded structure lies substantially in a single plane and may be stacked at once, without the necessity of trimming off a sprue or gate. In addition, this construction eliminates what would otherwise be a cooling or hardening tendency occurring in the sprue or gate, since the material enters the die cavity proper directly from the heated nozzle. This greatly increases the efficiency of lateral travel of the material.

Figure 11:
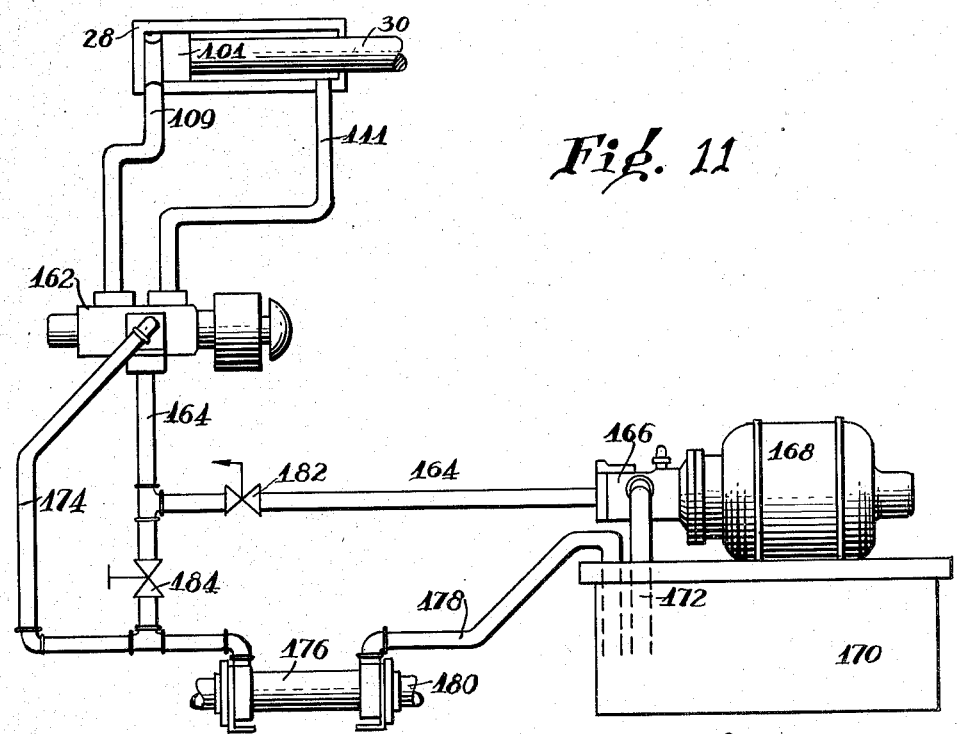
Fig. 11 is a schematic diagram of the hydraulic operating circuits.

Fig. 11 illustrates schematically one form of hydraulic system adapted to perform, under manual or automatic control, the necessary operations of the machine. In this figure, 28 designates the main cylinder as before, the piston being again indicated by 30 and having the enlarged end 101. Ducts 109 and 111 are connected to the four-way, solenoid operated spring offset valve 162, which in turn is connected by a conduit 164 to the hydraulic pump 166 driven by a motor 168. Oil for operation of the system is contained in a tank 170 from which it is drawn by pump 166 through a pipe 172 and then forced into the system.

It will be well understood with those familiar with this art that valve 162 in its normal or de-energized position operates to connect the pump pressure to duct 111, so as to maintain piston 30 in the left or rearward position, the duct 109 being connected through the valve and a return line 174 to an oil cooler 176 of usual form, and thence via conduit 178 to the tank 170. A pipe for supplying cooling water to the oil cooler 176 is designated by numeral 180. A check valve 182 is inserted in conduit 164 to prevent flow against the direction of the arrow on such valve. A bypass valve, manually adjustable, may be connected as at 184, which valve may be opened more or less when starting up the pump, and is also valuable when "inching" piston 30 during the initial setting up of the dies on the platens.

As stated, valve 162 is of the spring offset type, the spring normally operating to cause pressure to be applied to piston 30 to maintain it in its rearward position. When the solenoid of such valve is energized, however, the valve shifts to connect the high pressure conduit 164 with the duct 109, to cause piston 30 to move to the right, with the results pointed out above. At the same time, the valve connects duct 111 to the return line 174.

Means may be provided for the automatic timing of the injection period of the cycle, and such means will be described in connection with Fig. 12, which is a schematic diagram of the electrical controls for the machine. In this figure, L1 and L2 are the power mains, numeral 200 designates a timer of usual construction whose functions are outlined below, and 202 is a switch (shown also in Fig. 2) adapted to close its contacts when the door 204 is moved to the position in which it overlies the space between the platens. The purpose of this door switch is to prevent operation of the main piston, and hence movement of the platen 10 toward platen 12 until the door is closed, and the operator is hence clear of the space between such platens. Numeral 206 indicates the solenoid which controls valve 162. Switch 208 is the main switch for automatic operation of the machine, switch 210 enables manual control of the machine without the automatic timing feature, and switch 212 controls the heating circuit of the heating elements 38 (Fig. 3), through the thermostatic control indicated diagrammatically at 214, which in turn is controlled by the thermocouple 40 of Fig. 3 in a well known way.

The operation of timer 200 is as follows: clutch control solenoid 220 of the timer, when energized, operates to close contacts 222 completing a circuit to the synchronous motor 223 of the timer, and also closes contacts 224 controlling the external circuit. Upon completion of the pre-set time interval, contacts 224 open and the timer is reset for the next cycle.

Figure 12:
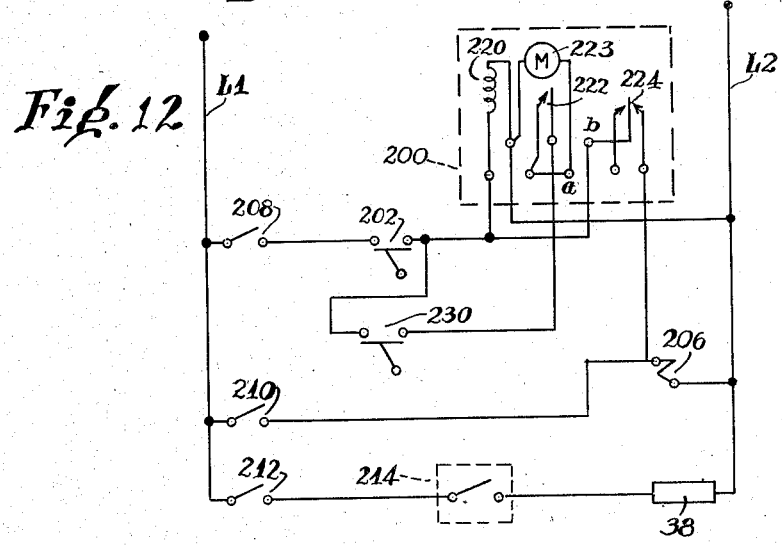
Fig. 12 is a schematic diagram illustrating the electrical control circuits.

In Fig. 12, a switch 230 is shown, this switch being mounted on platen 12 for engagement by platen 10 at such time as the two die halves 14 and 16 are engaged along their parting line; the position of this switch is diagrammatically indicated in Fig. 1.

To initiate automatically timed operation of the machine, the door 204 is closed, closing switch 202. Thereafter, the closure of main switch 208 completes a circuit from L1 through the solenoid 220 of the timer clutch, which closes contacts 222 and 224. The circuit from solenoid 220 is always completed to L2, hence contacts 222 and 224 remain closed, the latter contacts completing a circuit to the solenoid 206 of the valve 162, and piston 30 moves forward, carrying with it the platen 10 and die 14. The circuit to the motor of the timer, however, remains open at the die switch 230, hence the timed cycle does not begin until the die halves have closed, whereupon switch 230 completes a circuit through the (closed) contacts 222 to start the timer motor. At the end of the preset time, during which injection is proceeding, motor 223 opens contacts 224, which opens the circuit of solenoid 206 and causes the piston 30 to move to its rearward position, where it remains until switch 208 or door switch 202 is opened, thus deenergizing clutch solenoid 220, which causes contacts 222 to open and simultaneously recycles the timer in preparation for another cycle of operation. The time set on timer 200 is, of course, sufficient for both the actual injection phase, and such preliminary hardening time as is desired before the die halves are separated.

In some circumstances it may be permissible to start the timing cycle at the time the die halves start to close, rather than to wait until the closure is complete. This is possible in the present machine for the reason that injection of plastic is caused by movement of platen 12 to the right under pressure from die 14, whence premature injection of plastic into an unclosed die cannot occur. Such an arrangement can be made merely by omitting the die switch 230 or the connections thereto, and providing a jumper across the points $a$ and $b$ of the timer 200. In such a case, the timer motor will start as soon as the door 204 is closed, and will open contacts 224, breaking the circuit to valve solenoid 206, when the pre-set time has expired.

If manual control of the cycle is desired, switch 208 is left in the open position, and the cycle is initiated by closure of manual switch 210. This will energize valve solenoid 206 direct, and movement of piston 30 and its platen will perform the injection step, the die remaining closed until switch 210 is manually reopened, when the piston will return to its rearward position.

Switch 212 controls the power to the heating elements, which are also under the thermometric control of the thermostat 214 governed by the thermocouple 40 referred to above.

It will be seen from the above description that I have provided a machine in which a single source of pressure is utilized both to close the dies and to cause the injection of plastic thereinto, and that the manner in which this is done also provides inherent safety features which absolutely prevent the premature injection of plastic into an open die. This is accomplished without the use of the usual hydraulic or electrical interlocks and hence does not depend for its efficacy upon the proper functioning of any such external elements. Also, I have provided an optionally manual or automatic timing control for the injection and hardening interval, and a novel arrangement of parts which eliminates the wasteful and inefficient formation of a sprue of material between the pieces being molded and the tip of the injection nozzle.

In addition, I have provided an arrangement which achieves the irreducible minimum of transfer of heat from the injection nozzle to the adjacent die part, and in general have accomplished all the objects set out at the beginning of this specification.

While I have described a specific preferred embodiment of my invention in accordance with the patent statutes, such embodiment may be modified in various ways that will occur to skilled workers in the art, and I therefore wish it to be understood that the invention is not to be limited to the particular embodiment shown and described, but is to be construed to cover all such equivalent constructions as come within the scope of the appended claims.

I claim:

1. In a horizontal injection molding press, a pair of parallel platens adapted to mount upon their facing surfaces the respective members of a pair of complementary die parts, power drive means connected to the first of said platens to reciprocate the same toward and away from the second of said platens, a support frame beyond said second platen fixedly mounting an injection cylinder adapted to engage a die part on said second platen, said support frame being slidable in the direction of movement of said platens; a fixed end frame beyond said support frame and fixedly mounting an injection plunger received in said injection cylinder; a draw-bar freely slidable through said platens and said support frame and provided with a first abutment adjacent one end engageable by the first platen during movement of the latter away from the second platen, a second abutment lying beyond said second platen, and a third abutment lying beyond said support frame, said first and second abutments being spaced apart a distance substantially greater than the distance between the outer faces of said platens when the latter are in die-closed position.

2. The invention in accordance with claim 1, in which the distance between the active surfaces of said second and third abutments is greater than the distance between the respective surfaces of said second platen and said support frame when the latter parts are in their injection positions.

EDWARD R. KNOWLES.

REFERENCES CITED

The following references are of record in the file of this patent:

UNITED STATES PATENTS

| Number | Name | Date |
| --- | --- | --- |
| 1,922,937 | Eckert | Aug. 15, 1933 |
| 2,269,953 | Morin et al. | Jan. 13, 1942 |
| 2,309,729 | Gordon | Feb. 2, 1943 |
| 2,358,956 | Ashbaugh | Sept. 26, 1944 |
| 2,392,203 | Tucker | Jan. 1, 1946 |

FOREIGN PATENTS

| Number | Country | Date |
| --- | --- | --- |
| 429,769 | Great Britain | June 6, 1935 |
| 194,807 | Switzerland | Dec. 31, 1937 |